United States Patent
Ziegler et al.

(10) Patent No.: US 8,990,148 B1
(45) Date of Patent: Mar. 24, 2015

(54) SYSTEM AND METHOD FOR DYNAMIC HIERARCHICAL DATA PARSING

(71) Applicant: Sprint Communications Company L.P., Overland Park, KS (US)

(72) Inventors: Bruce Edward Ziegler, Olathe, KS (US); William Peter Bryan, Gardner, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 77 days.

(21) Appl. No.: 13/736,722

(22) Filed: Jan. 8, 2013

(51) Int. Cl.
G06F 17/30 (2006.01)
H04W 28/04 (2009.01)

(52) U.S. Cl.
CPC .... G06F 17/30129 (2013.01); G06F 17/30563 (2013.01); H04W 28/04 (2013.01)
USPC .......................................................... 707/602

(58) Field of Classification Search
CPC .......................... G06F 17/30563; H04W 28/04
USPC .......................................................... 707/602
See application file for complete search history.

(56) References Cited

PUBLICATIONS

CSS Tricks, Active Gzip Compression, Sep. 18, 2009.*
Devshed, How to Store CSS in Database for multi-themed site, 2005.*
W3C, Syntax and basic data types, Dec. 31, 2011.*
Wachsstock, jQuery CSS parser, Feb. 28, 2011.*

* cited by examiner

*Primary Examiner* — Mariela Reyes
*Assistant Examiner* — William Spieler

(57) ABSTRACT

A method is provided for parsing a configuration file. The method comprises determining whether an element in a sequence of configuration file elements is a type of element expected at the configuration file element's position in the sequence; when the configuration file element is not the expected type, consulting a set of rules for handling unexpected configuration file elements; and following a rule in the rule set. The rules cause different actions to be taken at a given position in the configuration file at different times of executing the method for parsing. One of the rules specifies that subsequent configuration file elements in the sequence are to be analyzed and, if at least one subsequent configuration file element is an expected type, the at least one subsequent configuration file element is to be considered valid and is to be parsed in a manner appropriate for the subsequent configuration file element.

20 Claims, 3 Drawing Sheets

SYSTEM AND METHOD FOR DYNAMIC HIERARCHICAL DATA PARSING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Switches and similar components in telecommunications systems may include configuration files that can store large amounts of data. The data may be stored in hierarchical data sets or similar data storage structures, any of which will be referred to herein as a configuration file. There may at times be a need to obtain data from a configuration file and place the data in another data storage location. Data storage components into which data may be transferred from a configuration file may include relational databases, spreadsheets, lightweight directory access protocol (LDAP)-based components, or similar data storage structures, any of which will be referred to herein as a database. Data may be stored in different formats in configuration files and in databases. For example, data is typically stored in a compressed form in a configuration file and in an uncompressed form in a database. Data may be stored in configuration files or databases in alphabetic form, in numeric form, or in alphanumeric form. Any of these types of data will be referred to herein as a character. Configuration files and databases may make use of features such as delimiters, selectors, and vectors. Terms such as these will be used herein in the manner of their typical use by those of skill in the art. Characters, delimiters, selectors, and vectors that appear in a configuration file may be referred to generically herein as configuration file elements or types of configuration file elements.

SUMMARY

In an embodiment, a method for parsing a configuration file is provided. The method comprises determining whether an element in a sequence of configuration file elements is a type of configuration file element expected at the configuration file element's position in the sequence; when the configuration file element is not the expected type, consulting a set of rules for handling unexpected configuration file elements; and following a rule in the set of rules. The rules may cause different actions to be taken at a given position in the configuration file at different times of executing the method for parsing. wherein the rules cause different actions to be taken at a given position in the configuration file at different times of executing the method for parsing. One of the rules specifies that at least one subsequent configuration file element in the sequence is to be analyzed and, if at least one subsequent configuration file element is a type that is expected, the at least one subsequent configuration file element is to be considered valid and is to be parsed in a manner appropriate for the subsequent configuration file element. Data in the configuration file may be generated by a switch in a telecommunications system.

In another embodiment, a system for parsing a configuration file is provided. The system comprises a memory, a processor, a parser, and a set of rules, stored in the memory, for handling unexpected elements in the configuration file. The parser is stored in the memory, executed by the processor, and configured to determine whether an element in a sequence of configuration file elements is a type of configuration file element expected at the configuration file element's position in the sequence. When the configuration file element is not the expected type, the parser is further configured to consult the set of rules. The parser is further configured to follow a rule in the set of rules. The rules may allow parsing to continue without error when an unexpected element is encountered.

In another embodiment, a method for parsing a configuration file is disclosed. The method comprises determining whether an element in a sequence of configuration file elements is a type of configuration file element expected at the configuration file element's position in the sequence, when the configuration file element is not the expected type, consulting a set of rules for handling unexpected configuration file elements, and following a rule in the set of rules, wherein one of the rules specifies that if a configuration file element is expected to be a delimiter character and is instead a different character, if the configuration file element is a type that is expected in the position subsequent to the missing delimiter character, the configuration file element is to be considered valid and is to be parsed in a manner appropriate for the subsequent configuration file element, wherein data in the configuration file is generated by a switch in a telecommunications system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
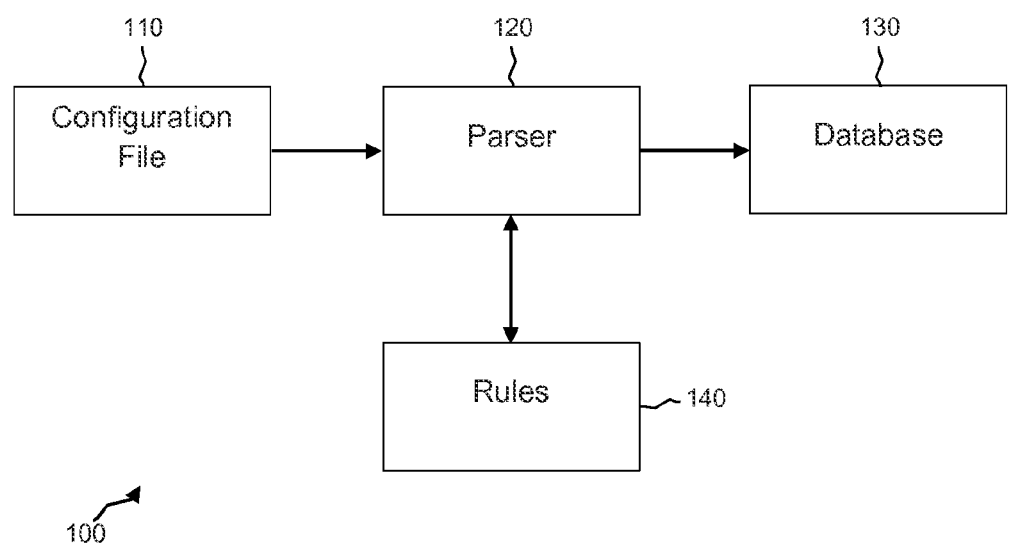
FIG. 1 is a block diagram of a system for parsing a configuration file according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Parsers currently exist for retrieving compressed data from a configuration file and placing the data in a database in an uncompressed form. Such parsers are typically hard coded. That is, each character, delimiter, selector, or vector in a configuration file is examined in sequence, and a fixed procedure is followed for converting each configuration file element into a corresponding database element. The parsing is typically position based, in that the procedure followed for each type of configuration file element depends on the position of the element in the configuration file. At a given position in the configuration file, the same action is taken every time the hard-coded parsing procedure is executed. If a configuration file element is encountered in an unexpected position, an error indication is generated. No analysis is performed on the unexpected configuration file element to attempt to determine an appropriate procedure for handling the unexpected element. If the position of a configuration file element within a configuration file is changed or if a configuration file element is added to or deleted from a configuration file, a corresponding modification may need to be made in the hard-coded parsing procedure.

Embodiments of the present disclosure provide a robust, resilient procedure for parsing data in a configuration file and placing the parsed data in a database. The data in the configuration file may be compressed, and the parsing may uncompress the data. Configuration file elements are dynamically analyzed according to a flexible set of rules in order to determine an appropriate procedure for converting the elements into corresponding database elements. The rules may cause different actions to be taken at a given position in the configuration file at different times of executing the dynamic parsing procedure, depending on the analysis of the configuration file element at that position. When an unexpected configuration file element is encountered, the dynamic parsing procedure can in some cases determine a course of action that will allow the parsing to continue without error. The parsing rules can be defined in such a way that a change to the parsing procedure is not necessarily needed when a change occurs to a configuration file.

A potential error-causing condition that may arise when a configuration file is parsed into a database is the presence of one type of configuration file element when another type is expected. For example, a character may be encountered when a delimiter is expected, a delimiter may be encountered when a character is expected, a selector may be encountered when a vector is expected, and so on. A hard-coded parser typically cannot handle such conditions and may simply generate an error message when an unexpected configuration file element is encountered.

The dynamic parser disclosed herein analyzes each element in a configuration file in sequence. When an unexpected configuration file element is encountered, the parser analyzes one or more of the next configuration file elements and consults a set of rules regarding expected elements. If one or more of the next configuration file elements is a type that is expected, the rules may specify that one or more of the next configuration file elements should be considered valid and should be processed in their usual manner.

For example, the dynamic parser may expect that a particular sequence in a configuration file should consist of three characters followed by a delimiter followed by three more characters followed by another delimiter. If the parser encounters a delimiter in the fifth position of the sequence, where a character is expected, the parser may analyze at least the sixth element in the sequence. If the sixth element is found to be a character, as expected, the parser may assume that the fifth element was invalid and that the sixth element and subsequent elements are valid. That is, the parser may assume that an extra delimiter was erroneously inserted into the configuration file at the fifth position. In some embodiments, the parser may analyze additional subsequent elements to gain additional assurance that the fifth element was invalid and that the sixth element and subsequent elements are valid. For instance, the parser may analyze the sixth, seventh, and eighth elements in the sequence. If all three of these subsequent elements are of the expected type for their respective positions, then all of these elements can be assumed to be valid. When the sixth element is determined to be valid, additional parsing as disclosed herein may resume at the sixth element. In some embodiments, the parser may generate an error message regarding the fifth element.

As another example, it may again be assumed that a particular sequence should consist of three characters followed by a delimiter followed by three more characters followed by another delimiter. If the parser encounters a character in the fourth position of the sequence, where a delimiter is expected, the parser may analyze at least the fifth element in the sequence. If the fifth element is found to be a character, the parser may assume that a delimiter was erroneously deleted from the fourth position of the configuration file and that the element currently at the fourth position and subsequent elements are valid. The parser may analyze additional subsequent elements as described above to gain additional assurance that the original fourth element is absent and that the current fourth element and subsequent elements are valid. When the current fourth element is determined to be valid, additional parsing as disclosed herein may resume at the fourth element. In some embodiments, the parser may generate an error message regarding the element that was erroneously deleted.

It should be understood that the scenarios described above are merely examples of how the dynamic parser may operate. When the parser encounters an unexpected configuration file element, the parser, working in conjunction with the rule set, may perform a different type of analysis on subsequent configuration file elements to determine an appropriate course of action. Regardless of how the analysis is performed, when the presence of an unexpected configuration file element and the analysis of subsequent configuration file elements indicate that a configuration file element has apparently been added to a configuration file erroneously, the next configuration file element after the unexpected configuration file element may be considered valid, and parsing as described herein may resume at the next configuration file element after the unexpected configuration file element. When the presence of an unexpected configuration file element and the analysis of subsequent configuration file elements indicate that a configuration file element has apparently been deleted from a configuration file erroneously, the unexpected configuration file element may be considered valid, and parsing as described herein may resume at the unexpected configuration file element.

In an embodiment, an additional procedure may be performed after an unexpected configuration file element is encountered. The parser may determine that a delimiter, selector, or vector may be erroneously present at a position in a configuration file and that a character that is present at a different position in the configuration file may belong at the position of the delimiter, selector, or vector. For example, an extra delimiter, selector, or vector may have been erroneously inserted at the fifth position of a sequence of configuration file elements, and a character that should have appeared at the fifth position may have been moved to the sixth position. In an embodiment, before replacing the delimiter, selector, or vector with the character, the parser may consult the rules to determine if the character is within an expected range of values for that character. If the character is within the expected range, the character may be considered valid, the parser may replace the delimiter, selector, or vector with the character, and parsing may resume at the character. If the character is not within the expected range, the character, delimiter, selector, and/or vector may be considered invalid, and an error message may be generated.

Additional or alternative actions may be taken when the parser determines that an expected vector appears to be absent or that an unexpected vector appears to be present. A vector in a configuration file may be assumed to indicate that one or more columns should be created in the corresponding database. In an embodiment, when the parser does not find a vector in a position in a configuration file where a vector was expected, the parsing rules may specify that one or more columns typically associated with that vector should be generated in the corresponding database, as if the vector had been in the expected position. A message may be generated to provide notification that the columns were created based on an assumption that a vector should have been present. In an embodiment, when the parser does find a vector in a position where a vector was not expected, it may be assumed that the vector was intentionally but unexpectedly added to the configuration file. In such a case, the parsing rules may specify that at least one column associated with the unexpected vector should be created. A message may be generated to provide notification that a column was created based on the unexpected vector.

FIG. 1 illustrates an embodiment of a system 100 for parsing configuration files. Data from a configuration file 110 is fed into a parser 120. In some embodiments, the data in the configuration file 110 has been generated by a switch or a similar component in a telecommunications system and is in a compressed form. In some cases, the switch may be a mobile switching center (MSC). The parser 120 consults a set of rules 140 to determine how to parse the data from the configuration file 110. After parsing the data, the parser 120 places the parsed data in an appropriate format in a database 130 or a similar component. The parsing may uncompress the data.

The parser 120 may execute on a first computer system, and the rules 140 may be stored in a memory of the first computer system. The configuration file 110 may be stored in a memory of a second computer system and, while being parsed, may be stored temporarily in a memory of the first computer system. The database 130 may be provided by a computer system and/or a secondary storage device such as a disk drive or a plurality of disk drives. Computer systems are described further hereinafter.

Figure 2:
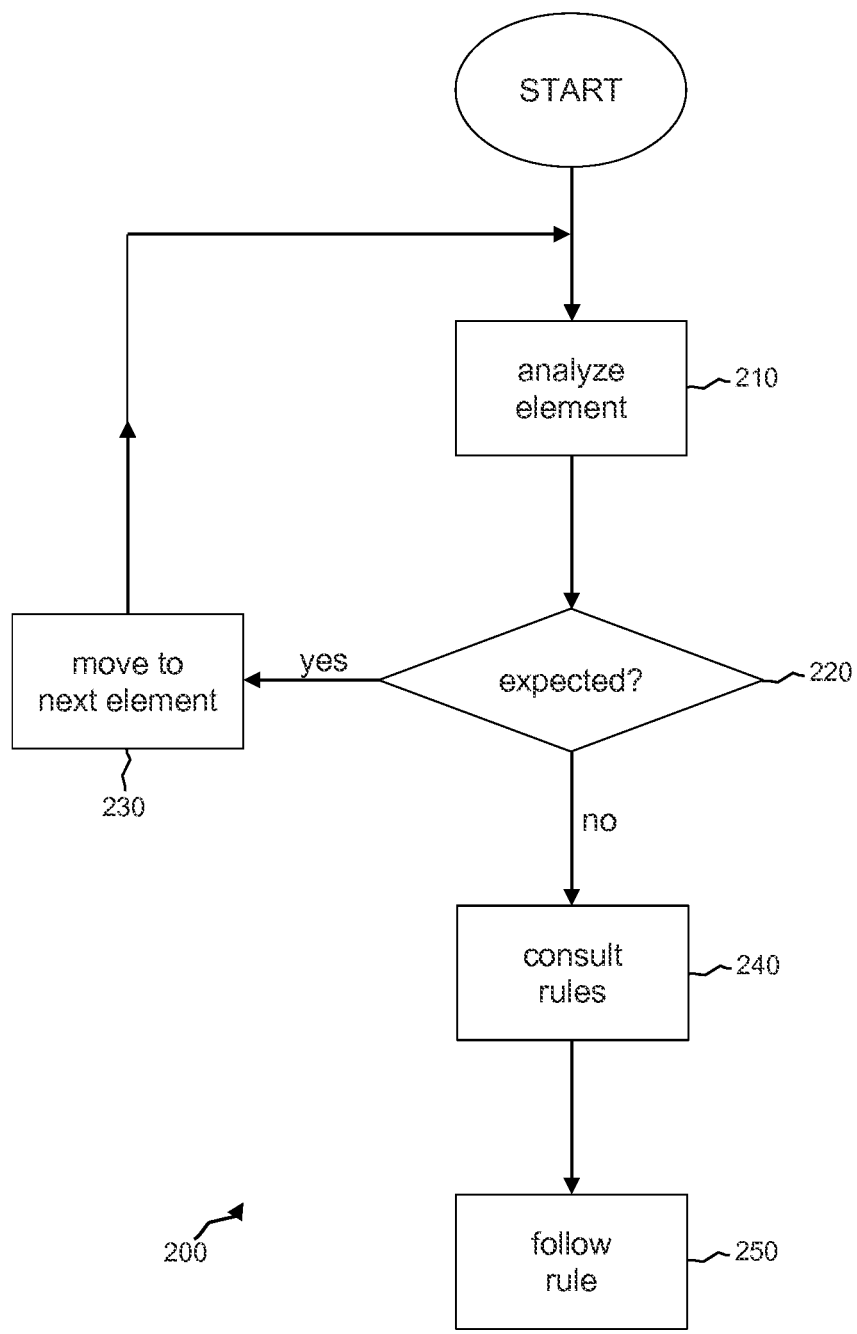
FIG. 2 is a flow chart illustrating a method for parsing a configuration file according to an embodiment of the disclosure.

FIG. 2 is a flow chart illustrating an embodiment of a method 200 for parsing configuration files. At block 210, a parser analyzes an element in a sequence of configuration file elements. At block 220, the parser determines whether the configuration file element is the type of element that is expected at that element's position in the sequence. If the configuration file element is the expected type, then at block 230, the parser moves to the next element in the sequence. These steps are repeated until an unexpected element is encountered at block 220. When the unexpected element is encountered, the parser, at block 240, consults a set of rules for handling unexpected elements. At block 250, the parser follows a rule in the rule set that is appropriate for the unexpected element. When parsing of one or more configuration file elements is complete, the parsed elements may be written to a database.

Figure 3:
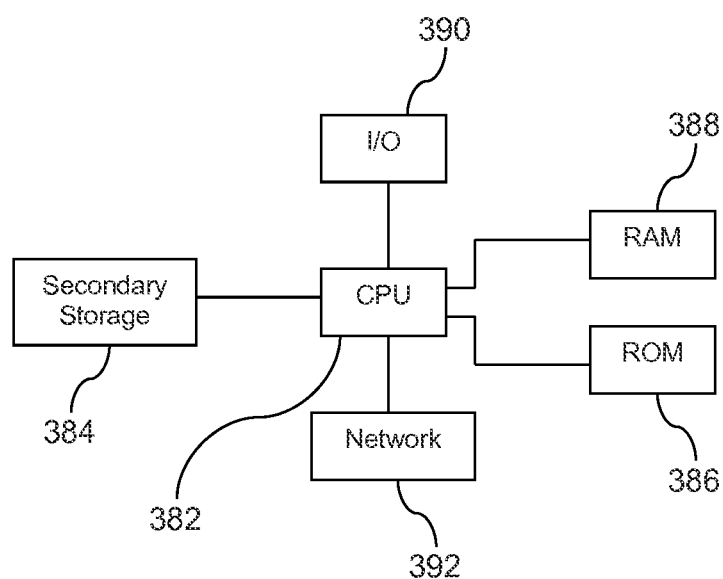
FIG. 3 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for dynamic parsing of a configuration file of a telecommunication system, comprising:
    receiving, on a dynamic parser stored in a non-transitory memory of a server of the telecommunication system and executed by a processor of the server, from a communicatively coupled switch, data of the configuration file that is generated on the switch of a telecommunications network, wherein the data of the configuration file comprises a plurality of configuration file elements that form a sequence of configuration file elements, each of the configuration file elements having a type and a position in the sequence, and wherein the data of the configuration file comprises errors generated on the switch associated with configuration file elements that include at least one of a character, a delimiter, a selector, and a vector;
    analyzing, by the dynamic parser, the type of configuration file element at a corresponding position in the sequence of configuration file elements;
    determining, by the dynamic parser, whether the configuration file element in the sequence of configuration file elements is an expected type of configuration file element at the corresponding position in the sequence of configuration file elements;
    responsive to a determination that the configuration file element is not the expected type, selecting, by the dynamic parser, a rule of a set of rules based on the analyzed type of configuration file element, the expected type of configuration file element, and consulting the set of rules that at least handle configuration file elements that are not the expected type; and
    applying, by the dynamic parser, the selected rule of the set of rules to the configuration file element that is not the expected type, wherein applying the selected rule of the set of rules causes dynamic parsing to continue for at least one subsequent configuration file element in the sequence that is in a position subsequent to the configuration file element which is not the expected type;
    dynamically parsing, by the dynamic parser, the configuration file element that is not the expected type by at least one of replacing the configuration file element that is not the expected type, creating at least one column associated with a vector in a database element file, and validating the configuration file element that is not the expected type at the position in the sequence; and
    writing, by the dynamic parser, the data of the configuration file that is dynamically parsed into a communicatively coupled database.

2. The method of claim 1, wherein the switch is a mobile switching center.

3. The method of claim 1,
    wherein the selected rule is selected responsive to an indication that the configuration file element is an unexpected addition to the sequence of configuration file elements, and
    wherein applying the selected rule by the dynamic parser comprises:
        generating a message that provides a notification of the unexpected addition, and
        continuing dynamic parsing of the configuration file element that is next in position in the sequence of configuration file elements after the configuration file element that is not the expected type.

4. The method of claim 1,
    wherein the selected rule is selected responsive to an indication that missing configuration file element that is expected is missing due to an unexpected deletion from the sequence of configuration file elements, and wherein applying the selected rule by the dynamic parser comprises:

generating a message that provides a notification of the missing configuration file element, and continuing dynamic parsing of the configuration file element at the configuration file element that is not the expected type.

5. The method of claim 1, wherein the selected rule is selected responsive to an indication that the at least one subsequent configuration file element is an alphabetic, numeric, or alphanumeric character, and wherein applying the selected rule by the dynamic parser comprises:

comparing the at least one subsequent configuration file element to an expected range of values for the at least one subsequent configuration file element, and responsive to an indication that the at least one subsequent configuration file element is outside of the expected range of values, generating a message that provides a notification based on the indication and continuing dynamic parsing at a subsequent position in the sequence of configuration file elements.

6. The method of claim 1, wherein the selected rule is selected responsive to an indication that a missing vector that is expected is missing due to an unexpected deletion from the sequence of configuration file elements, and wherein applying the selected rule by the dynamic parser comprises:

generating a message that provides a notification of the missing vector, and continuing dynamic parsing of the configuration file element that is not the expected type by operating as if the missing vector is present.

7. The method of claim 1, wherein the selected rule is selected responsive to an indication that vector existing in the sequence of configuration file element is an unexpected addition to the sequence of configuration file elements, and wherein applying the selected rule by the dynamic parser comprises:

generating a message that provides a notification of the unexpected addition of the vector, and specifying creation of at least one column associated with the vector in a database that is communicatively coupled with the dynamic parser.

8. The method of claim 1, wherein responsive to receiving the configuration file in a compressed format, the dynamic parser converts the configuration file to an uncompressed format prior to sending the data from the configuration file to a database.

9. The method of claim 1, further comprising generating, by the switch of the telecommunications network, the data of the configuration file during communicative coupling with the telecommunication network.

10. A system for dynamic parsing of a configuration file of a telecommunications system, comprising:

a switch of the telecommunication system that generates data in the configuration file;

at least one server comprising:

a non-transitory memory comprising data of the configuration file that is received from the switch, wherein the data of the configuration file comprises a plurality of configuration file elements that form a sequence of configuration file elements, each of the configuration file elements having a type and a position in the sequence, and wherein the data of the configuration file comprises errors generated on the switch associated with configuration file elements that include at least one of a character, a delimiter, a selector, and a vector;

at least one processor;

a set of rules stored in the non-transitory memory for handling the configuration file elements in the configuration file; and a dynamic parser stored in the non-transitory memory that, when executed by the at least one processor, configures the at least one processor to:

analyze the type of configuration file element at a corresponding position in the sequence of configuration file elements, determine whether the configuration file element in the sequence of configuration file elements is an expected type of configuration file element at the corresponding position in the sequence of configuration file elements, responsive to a determination that the configuration file element is not the expected type, select a rule of the set of rules based on the analyzed type of configuration file element, the expected type of configuration file element, and consultation of the set of rules, apply the selected rule, which causes dynamic parsing to continue without error for at least one configuration file element in the sequence that is in a position subsequent to the configuration file element that is not the expected type, dynamically parse the configuration file element that is not the expected type by at least one of replacing the configuration file element that is not the expected type, creating at least one column associated with a vector in a database element file, and validating the configuration file element that is not the expected type at the position in the sequence, and write the data of the configuration file that is dynamically parsed into a communicatively coupled database of the telecommunications system.

11. The system of claim 10, wherein the selected rule is selected responsive to an indication that the configuration file element is an unexpected addition to the sequence of configuration file elements, and wherein application of the selected rule by the dynamic parser comprises:

generation of a message that provides a notification of the unexpected addition, and continuation of dynamic parsing of the configuration file element that is next in position in the sequence of configuration file elements after the configuration file element that is not the expected type.

12. The system of claim 10, wherein the selected rule is selected responsive to an indication that a missing configuration file element that is expected is missing due to an unexpected deletion from the sequence of configuration file elements, and wherein application of the selected rule by the dynamic parser comprises:

generation of a message that provides a notification of the missing configuration file element, and continuation of dynamic parsing of the configuration file element at the configuration file element that is not the expected type.

13. The system of claim 10,
wherein the selected rule is selected responsive to an indication that the at least one subsequent configuration file element is an alphabetic, numeric, or alphanumeric character, and
wherein application of the selected rule by the dynamic parser comprises:
   comparison of the at least one subsequent configuration file element to an expected range of values for the at least one subsequent configuration file element, and
   responsive to an indication that the at least one subsequent configuration file element is outside of the expected range of values, generation of a message that provides a notification based on the indication and continuing dynamic parsing at a subsequent position in the sequence of configuration file elements.

14. The system of claim 10,
wherein the selected rule is selected responsive to an indication that a missing vector that is expected is missing due to an unexpected deletion from the sequence of configuration file elements, and
wherein application of the selected rule by the dynamic parser comprises:
   generation of a message that provides a notification of the missing vector, and
   continuation of dynamic parsing of the configuration file element that is not the expected type by operating as if the missing vector is present.

15. The system of claim 10,
wherein the selected rule is selected responsive to an indication that a vector existing in the sequence of configuration file element is an unexpected addition to the sequence of configuration file elements, and
wherein application of the selected rule by the dynamic parser comprises:
   generation of a message that provides a notification of the unexpected addition of the vector, and
   creation of at least one column associated with the vector in a database that is communicatively coupled with the dynamic parser.

16. The system of claim 10, wherein the dynamic parser further configures the processor to identify whether the configuration file is a compressed file format, and responsive to an identification that the configuration file is compressed, the dynamic parser further configures the processor to convert the configuration file to an uncompressed file format that is stored in the communicatively coupled database.

17. The system of claim 10, wherein the switch is at least one of a network switch or a mobile switching center in the telecommunications system.

18. A method for dynamic parsing of a configuration file of a telecommunications system, comprising:
   generating, by a switch of the telecommunications system, data of the configuration file;
   receiving, from the switch, the configuration file on a server comprising a dynamic parser, wherein the data of the configuration file comprises errors generated on the switch associated with configuration file elements;
   determining, by the dynamic parser stored in a non-transitory memory of the server and executed by a processor of the server, whether a configuration file element at a position in a sequence of configuration file elements is an expected type of configuration file element at the corresponding position in the sequence of configuration file elements;
   responsive to a determination that the configuration file element is not the expected type, consulting, by the dynamic parser, a set of rules that handles dynamic parsing of the configuration file element that is not expected at the corresponding position in the sequence of configuration file elements;
   applying, by the dynamic parser, a rule of the consulted set of rules in response to a determination by the dynamic parser that the configuration file element is not an expected delimiter character type, wherein application of the rule comprises continuing dynamic parsing of at least a configuration file element that is in a next subsequent position in the sequence of configuration file elements after the configuration file element that is not the expected delimiter character type;
   dynamically parsing, by the dynamic parser, the configuration file element that is not the expected type by at least one of replacing the configuration file element that is not the expected type, creating at least one column associated with a vector in a database element file, and validating the configuration file element that is not the expected type at the position in the sequence; and
   writing, by the dynamic parser, the data of the configuration file that is dynamically parsed into a communicatively coupled database.

19. The method of claim 18, wherein application of the rule is responsive to analysis, by the dynamic parser, of at least one subsequent configuration file element in the sequence of configuration file elements that indicates that the at least one subsequent configuration file element is the expected type.

20. The method of claim 18, further comprising placing, by the dynamic parser, the data of the configuration file into a format of the communicatively coupled database.

* * * * *